United States Patent [19]

Jordan

[11] Patent Number: 5,080,120
[45] Date of Patent: Jan. 14, 1992

[54] REPLACEABLE VALVE SEAT

[75] Inventor: Raymond W. Jordan, Greensburg, Pa.

[73] Assignee: The United States of America as represented by the Secretary of the Navy, Washington, D.C.

[21] Appl. No.: 691,287

[22] Filed: Apr. 25, 1991

[51] Int. Cl.⁵ .............................................. F16K 37/00
[52] U.S. Cl. ....................................... 137/1; 137/312; 137/559; 251/363
[58] Field of Search ................. 251/363; 137/559, 312, 137/1

[56] References Cited

U.S. PATENT DOCUMENTS

| | | | |
|---|---|---|---|
| 1,316,539 | 9/1919 | Ford | 251/363 |
| 1,540,380 | 6/1925 | Wilson | 251/363 |
| 1,616,672 | 2/1927 | Wilson | 251/363 X |
| 2,053,006 | 9/1936 | Noss | 251/363 |
| 3,327,991 | 6/1967 | Wallace | 251/363 X |
| 3,414,014 | 12/1968 | Merchant | 137/559 |
| 3,435,842 | 4/1969 | Ogawa | |
| 4,471,943 | 9/1984 | Nelson | |
| 4,474,208 | 10/1984 | Looney | |
| 4,519,582 | 5/1985 | Freeman | |
| 4,611,788 | 9/1986 | Thomsen | |
| 4,634,098 | 1/1987 | Varden | |
| 4,643,224 | 2/1987 | Rung | |
| 4,901,979 | 2/1990 | Garrigues | |

Primary Examiner—Alan Cohan
Attorney, Agent, or Firm—Tamara L. Weber; Edward J. Connors, Jr.; William C. Townsend

[57] ABSTRACT

A valve with an O-ring, a disk seal, and a replaceable valve seat. A groove in the bottom of the valve seat flange forms an inner and outer drip ledge with the inner and outer periphery of the flange. If leakage occurs at the valve seat O-ring, fluid droplets will form on the outer drip ledge. If leakage occurs at the disk seal, fluid droplets will form on the inner drip ledge. A visual inspection of these drip ledges through an access port, or by a borescope placed in an inspection port, can discriminate between a leak which originates in the O-ring and a leak which originates in the disk seal.

17 Claims, 2 Drawing Sheets

REPLACEABLE VALVE SEAT

FIELD OF THE INVENTION

This invention relates to valve seats, and more particularly to valve seats which are designed to be easily replaceable.

BACKGROUND OF THE INVENTION

Replaceable valve seats are well known in the prior art. With these valve seats, leak paths exist at both the valve seat seal and the disk seal. When such valve seats leak, it is not possible to determine whether the leak originates in the valve seat seal or the disk seal. As a result, both the valve seat seal and the disk seal must be replaced. Replacement of the valve seat seal is difficult and can result in permanent damage to the valve body. It is desirable to have a positive indication of the leak source to avoid unnecessary repairs.

SUMMARY OF THE INVENTION

When conventional replaceable valve seats leak, fluid droplets form at the bottom of the valve seat. In the present invention, such a valve seat is modified by machining a groove on the bottom surface of the valve seat flange. This groove and the inner and outer surfaces of the flange intersect and form drip ledges. If leakage occurs at the valve seat seal, shown as an O-ring in the preferred embodiment, fluid droplets will form on the outer drip ledge. If leakage occurs at the valve disk seal, fluid droplets will form on the inner drip ledge. The drip ledges can be inspected either through an access port or by passing a borescope through a small inspection port in the valve case. Visual inspection of the bottom of the drip ledges will positively identify the required repair action.

BRIEF DESCRIPTION OF THE DRAWINGS

The invention will be best understood by referring to the accompanying drawings, wherein.

DETAILED DESCRIPTION

Figure 1:
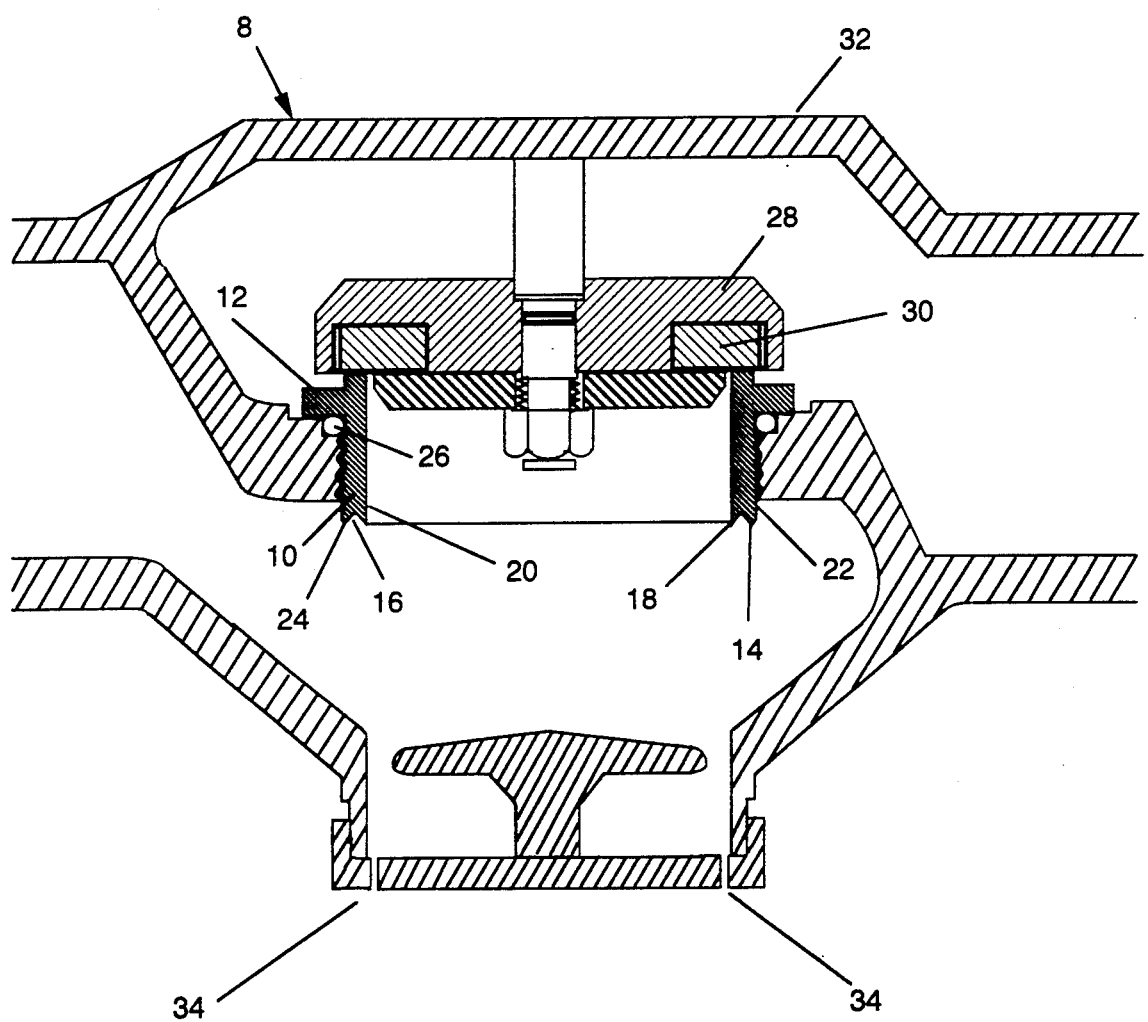
FIG. 1 illustrates a valve with a replaceable valve seat and two access ports.

FIG. 1 illustrates a valve 8 with a replaceable valve seat 12 and two access ports 34. A flange 10 projects from a replaceable valve seat 12. The bottom surface 14 of the flange 10 has a groove 16. This groove 16 may have a "V" shape, a "U" shape, or any other shape which forms an inner drip ledge 18 where it intersects with the inner peripheral surface 20 of a flange 10, and an outer drip ledge 22 where it intersects with the outer peripheral surface 24 of a flange 10. An O-ring 26 is located at the periphery of the valve seat 12. A valve disk 28 is located above the valve seat 12. There is a disk seal 30 located between the valve disk 28 and the valve seat 12. All of the parts listed above are enclosed by a valve case 32. The valve case 32 has access ports 34 which allow for visual inspection of the inner drip ledge 18 and outer drip ledge 22. Such an inspection is used to distinguish between a leak in the valve seat 12 caused by failure of the O-ring 26, and a leak in the valve seat 12 caused by failure of the disk seal 30.

Figure 2:
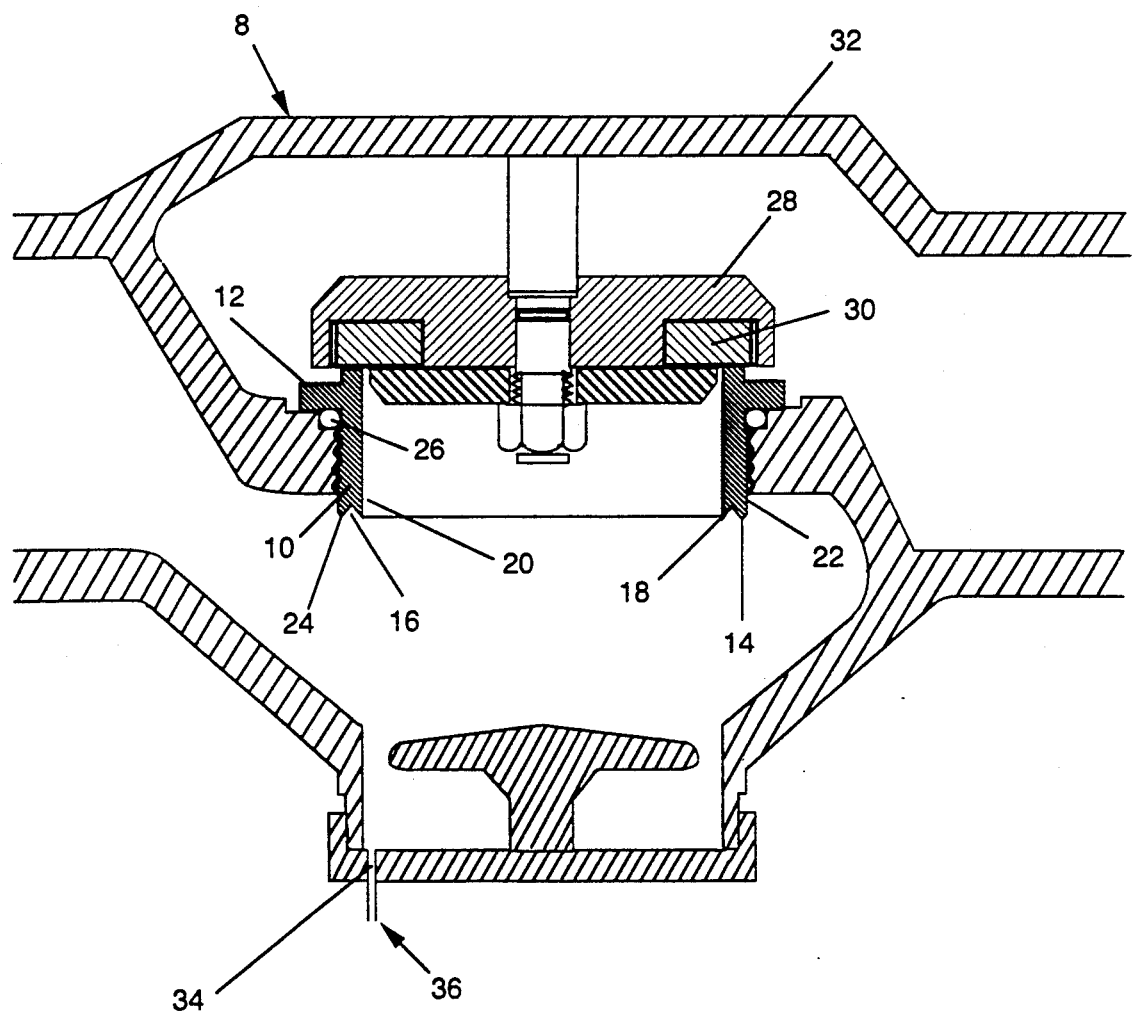
FIG. 2 illustrates a valve with a replaceable valve seat and an inspection port.

FIG. 2 illustrates an alternate form of the invention in which a valve 8 includes a replaceable valve seat 12 and an inspection port 34. A flange lo projects from a replaceable valve seat 12. The bottom surface 14 of the flange 10 has a cavity 16. This cavity 16 may have a "V" shape, a "U" shape, or any other shape which forms an inner drip ledge 18 where it intersects with the inner peripheral surface 20 of the flange 10, and an outer drip ledge 22 where it intersects with the outer peripheral surface 24 of the flange 10. An O-ring 26 is located at the periphery of the valve seat 12. A valve disk 28 is located above the valve seat 12. There is a disk seal 30 located between the valve disk 28 and valve seat 12. All of the parts listed above are enclosed by a valve case 32. The valve case 32 has an inspection port 34 which permits passage of a borescope 36. Visual inspection of the inner drip ledge 18 and outer drip ledge 22 with a borescope 36 is used to determine whether a leak in the valve seat 12 originates in the O-ring 26 or disk seal 30.

This invention has been described in detail with particular reference to certain preferred embodiments thereof, but it should be understood that variations and modifications can be effected within the spirit and scope of the invention.

What is claimed is:

1. A valve comprising:
   a valve seat,
   a flange with a "V" shaped cavity
   wherein said flange projects from said valve seat,
   an inner surface of said flange,
   an outer surface of said flange,
   a bottom surface of said flange,
   wherein said "V" shaped cavity is located on said bottom surface of said flange, between said inner surface and said outer surface,
   an inner drip ledge formed by said inner surface of said flange and said "V" shaped cavity,
   an outer drip ledge formed by said outer surface of said flange and said "V" shaped cavity,
   a valve disk,
   a disk seal located between said valve seat and said valve disk,
   a valve seat seal located at the outer periphery of said valve seat, and
   means for inspecting said inner drip ledge and said outer drip ledge.

2. The device of claim 1 wherein said valve seat seal comprises an O-ring.

3. The device of claim 2 wherein said means for inspecting comprises an access port.

4. A method for determining the source of a valve seat leak comprising the steps of:
   forming a groove on the bottom surface of a valve seat flange to provide a drip ledge, and
   inspecting said drip ledge,
   whereby the source of any valve seat leak is indicated by the location of fluid droplets viewed during said inspection.

5. The method of claim 4 wherein the step of inspecting said drip ledge comprises the step of viewing said drip ledge through an access port.

6. The method of claim 4 wherein the step of inspecting said drip ledge further comprises the steps of:
   inserting a borescope through an inspection port, and
   viewing said drip ledge by means of said borescope.

7. A valve comprising:
   a valve seat,
   a flange projecting from said valve seat,
   wherein said flange contains a groove,
   wherein said groove has a "V" shape, an inner surface of said flange,
an outer surface of said flange,
a bottom surface of said flange,
wherein said groove is located on said bottom surface of said flange, between said inner surface and said outer surface,
a valve disk, and
a disk seal located between said valve seat and said valve disk.

8. A valve comprising:
a valve seat,
a flange projecting from said valve seat,
wherein said flange contains a groove,
an inner surface of said flange,
an outer surface of said flange,
a bottom surface of said flange,
wherein, said groove is located on said bottom surface of said flange, between said inner surface and said outer surface,
wherein said groove provides a drip ledge,
a valve seat seal located at the outer periphery of said valve seat,
a valve disk, and
a disk seal located between said valve seat and said valve disk.

9. The device of claim 8 further comprising a means for inspecting said bottom surface of said flange.

10. A valve comprising:
a valve seat,
a flange projecting from said valve seat,
wherein said flange contains a groove,
an inner surface of said flange,
an outer surface of said flange,
a bottom surface of said flange,
wherein, said groove is located on said bottom surface of said flange, between said inner surface and said outer surface,
wherein said groove has a "V" shape,
a valve seat seal located at the outer periphery of said valve seat,
a valve disk,
a disk seal located between said valve seat and said valve disk, and
a means for inspecting said bottom surface of said flange.

11. The device of claim 10 further comprising:
a valve case with an access port,
wherein said valve case encloses said valve seat, said flange, said valve disk, said disk seal, and said valve seat seal, and
wherein said means for inspecting comprises said access port.

12. The device of claim 10 further comprising:
a valve case with a plurality of access ports,
wherein said valve case encloses said valve seat, said flange, said valve disk, said disk seal, and said valve seat seal,
wherein said means for inspecting comprises said plurality of access ports.

13. A valve comprising:
a valve seat,
an valve seat seal located at the outer periphery of said valve seat,
a valve disk,
a disk seal located between said valve seat and said valve disk,
a flange with a cavity,
wherein said flange projects from said valve seat,
an inner surface of said flange,
an outer surface of said flange,
a bottom surface of said flange,
wherein said cavity is located on said bottom surface of said flange, between said inner surface and said outer surface, and
means for inspecting said flange.

14. The device of claim 13 wherein said cavity has a "V" shape.

15. The device of claim 14 wherein said means for inspecting comprises an access port.

16. A valve comprising:
a valve seat,
a valve seat seal located at the outer periphery of said valve seat,
a valve disk,
a disk seal located between said valve seat and said valve disk, and
a flange with a cavity,
wherein said flange projects from said valve seat,
an inner surface of said flange,
an outer surface of said flange,
an inner drip ledge formed by said inner surface of said flange and said cavity,
an outer drip ledge formed by said outer surface of said flange and said cavity, and
a means for inspecting said inner drip ledge and said outer drip ledge.

17. The device of claim 16 wherein said means for inspecting said inner drip ledge and said outer drip ledge comprises an inspection port.

* * * * *